United States Patent [19]

Sweeny

[11] Patent Number: 4,980,446

[45] Date of Patent: Dec. 25, 1990

[54] MELT-PROCESSIBLE AROMATIC CONTAINING COPOLYAMIDE FROM 3,4'-BIS (AMINO PHENYL)ETHER

[75] Inventor: Wilfred Sweeny, Wilmington, Del.

[73] Assignee: E. I. Du Pont de Nemours and Company, Wilmington, Del.

[21] Appl. No.: 324,547

[22] Filed: Mar. 16, 1989

[51] Int. Cl.$^5$ .............................................. C08G 69/32
[52] U.S. Cl. ................................... 528/183; 528/176; 528/338; 528/339; 528/340; 528/347; 528/348
[58] Field of Search ................ 528/183, 348, 176, 347

[56] References Cited

U.S. PATENT DOCUMENTS

| | | | |
|---|---|---|---|
| 4,075,172 | 2/1978 | Ozawa et al. | 528/183 |
| 4,355,151 | 10/1982 | Shimada et al. | 528/183 |
| 4,782,131 | 11/1988 | Sweeny | 528/180 |

Primary Examiner—Harold D. Anderson

[57] ABSTRACT

Melt-processible aramids are prepared by catalytic polyamidation of 3,4'-bisaminophenyl ether with diphenylisophthalate or diphenyl 5-t-butylisophthalate and minor amounts of aliphatic components.

7 Claims, No Drawings

MELT-PROCESSIBLE AROMATIC CONTAINING COPOLYAMIDE FROM 3,4'-BIS (AMINO PHENYL)ETHER

BACKGROUND OF THE INVENTION

Aromatic polyamides having a high Tg are well known. Generally, they are spun or cast from solution. Obviously melt-processibility would be more desirable. It is a worthwhile objective to provide melt-processible aromatic polyamides with such levels of Tg >150°C.

SUMMARY OF THE INVENTION

This invention provides a melt-processible aromatic (co)polyamide having a Tg greater than 150°C. consisting essentially of the following recurring structural units:

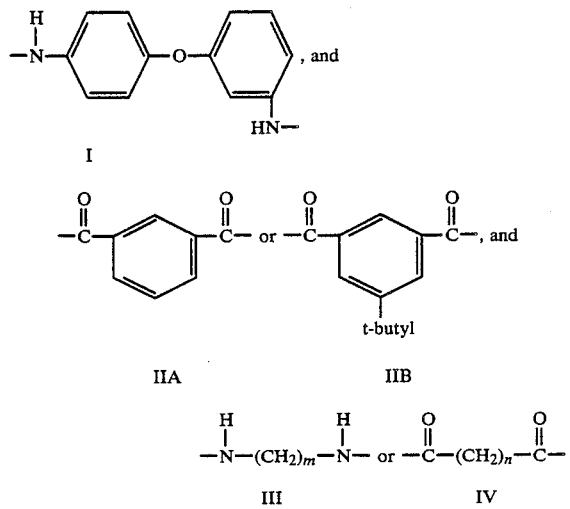

wherein m is an integer of from 6-12, n is an integer of from 4-10, with the proviso that when unit IIA is present, unit III may comprise from about 5-15 mol % of the mixture of units I and III and unit IV may comprise from about 5-15 mol % of the mixture of units IIA and IV, while when unit IIB is present, unit III may comprise from 0 to about 15 mol % of the mixture of units I and III and unit IV may comprise from 0 to about 15 mol % of the mixture of units IIB and IV, the number of amino and carbonyl groups in the (co)polyamide being in substantially equimolar proportions.

Also part of the invention is the catalytic polyamidation process for preparing the aforementioned (co)polyamides, comprising reacting 3,4'-bisaminophenyl ether with diphenylisophthalate or diphenyl 5-t-butylisophthalate and an aliphatic diamine of the formula $H_2N-(CH_2)_m-NH_2$ or a diphenyl ester of an aliphatic dicarboxylic acid of the formula

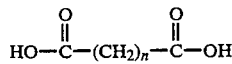

in the presence of an alkali metal fluoride catalyst, at elevated temperatures while removing phenol. The aliphatic diamine and aliphatic dicarboxylic acid may be omitted when diphenyl 5-t-butylisophthalate is employed thereby resulting in a homopolymer.

DETAILED DESCRIPTION OF THE INVENTION

The present invention involves a catalytic polyamidation to yield melt-processible aromatic polyamides having a Tg greater than 150°C. and a melting point below 350°C. The reactants employed are 3,4-bisaminophenyl ether, diphenyl isophthalate or diphenyl 5-t-butylisophthalate and an aliphatic diamine of from 6 to 12 carbon atoms in length or a 6-12 carbon atom aliphatic dicarboxylic acid, preferably in the form of the diphenyl ester to permit phenol removal. A preferred diamine is hexamethylene diamine and the preferred diester of the aliphatic acid is diphenyl adipate. The diphenyl sebacate should also prove useful. To obtain a suitable tough polymer, it is important to use an alkali metal fluoride catalyst in the process. The preferred catalysts are potassium fluoride and cesium fluoride which are employed in an effective amount to achieve polyamidation. Typically an amount of catalyst is employed which ranges from about 0.1% to 0.2% based on the total weight of ingredients.

In order to obtain the reasonably high Tg, the molar proportion of aliphatic diamine or dicarboxylic acid in the combination of diamino or diacid reactants is restricted, preferably in the range of 5 to 15 mol % of the mixture, except when diphenyl 5-t-butylisophthalate is employed when little or no aliphatic component can be used. The presence of units III or IV is optional when units I and IIB of the above-listed formulae are present. However, units III or IV are required for melt-processibility when units I and IIA constitute the major portion of the polymer.

In the process, the materials are combined and heated, preferably at temperatures in the range of 260°C. to 340°C. Phenol is given off during the polyamidation and is removed by means well known in the art. Termination of phenol evolution indicates that the reaction is complete and the polymer may be recovered. Continued heating may be employed to increase the polymer molecular weight.

The resulting polymer is found to be melt-processible in that it can be melt-formed into useful fibers or melt-pressed into films without decomposition or undesirable degradation. The polymer inherent viscosity is generally in the range of at least 0.3 or even higher.

Test Procedures

Inherent viscosity, $\eta_{inh}$, is defined by the following equation:

$$\eta_{inh} = \frac{\ln(\eta_{rel})}{C}$$

where $\eta_{rel}$ is the relative viscosity and C is the concentration in grams of polymer per deciliter of solvent, typically 0.5 g in 100 ml. (Thus, the units for inherent viscosity are dl/g.) The relative viscosity, $\eta_{rel}$, is determined by dividing the flow time of the dilute solution in a capillary viscometer by the flow time for the pure solvent. The flow times are determined at 30°C. The solvents are 98% sulfuric acid or dimethylacetamide (DMAc) containing 4% LiCl.

The glass transition temperature, $T_g$, is determined from curves run at 10°C. per min on an approximately 5 mg sample in a nitrogen atmosphere using a Differential Scanning Calorimeter attachment with a Du Pont 1090 Thermal Analyzer.

The polymer melting temperature was measured on a gradient temperature hot bar and is the lowest temperature at which the polymer will melt and stick to the bar.

The following examples are offered to illustrate the invention and are not to be construed as limiting:

EXAMPLE 1

In a round bottom flask equipped with distillation head and take off, and side arm fitted with an argon inlet was put (0.02 molar scale) 3.6 g 3,4'-bis-aminophenyl ether; 0.4 g 1,12-diaminododecane; 6.3 g diphenyl isophthalate; 0.02 g cesium fluoride. The flask and reactants were repeatedly evacuated and purged with argon to remove air from the reactants. Then under a slow stream of argon, the flask was immersed in a Woods metal bath at 260°C. Rapid evolution of phenol occurred which appeared complete in about 10 minutes. The temperature was then raised to 280°C. and a vacuum slowly applied to assist removal of residual phenol and continue the polymerization. The thick polymer residue was heated at about 0.6 mm pressure for 1.5 hours. The bath was then removed, the vacuum released and the flask immersed in liquid nitrogen to assist removal of the polymer from the glass on breakage of the flask. A tough brown polymer resulted that gave clear almost colorless films on pressing in a Carver press at 300°C./ 8000 psi. These films were drawable at 240°C. to clear tough films. The polymer melted on the hot bar at about 285°C. at which temperature flexible fibers could be drawn. The polymer inherent viscosity was 0.64 measured in DMAc containing 4% of lithium chloride. The Tg was 215°C.

The above was repeated but excluding the cesium fluoride. A brittle glass resulted. Yield of polymer from the CsF reaction was 5.56 g and was 3.4 g when the CsF was omitted. The polymer inherent viscosity was only 0.16.

EXAMPLE 2

The above reaction was repeated except the 1,12-diaminododecane was replaced by 0.23 g hexamethylenediamine. Similar results were obtained. The CsF reaction yielded 6.4 g tough, light brown polymer that yielded flexible fibers on drawing from a melt on the hot bar at 295°C. This appeared to be the temperature at which the fiber first melted. Clear, almost colorless, tough films could be pressed at 300°C. These could also be drawn at 240°C. The polymer inherent viscosity was 0.50 measured in 98% sulfuric acid. The Tg was 220°C. The reaction without the CsF yielded 3.4 g brittle glasslike polymer.

EXAMPLE 3

Example 1 was repeated using potassium fluoride in place of cesium fluoride. Tough, clear polymer resulted. Yield 5.7 g. Fibers could be drawn from a hot bar at about 290°C. Prolonged exposure at about 300° reduced fusibility. The inherent viscosity of the polymer measured in DMAc containing 4% lithium chloride was 1.02. The Tg was 204°C.

EXAMPLE 4

Using equipment similar to Example 1, a 90/10 molar copolymer was prepared from 4.0 g 3,4'-bisaminophenyl ether; 5.7 g diphenyl isophthalate; 0.5 g diphenyl adipate; 0.0 lg cesium fluoride. The flask containing reactants was repeatedly evacuated and purged with argon to remove air from the reactants. Then under a slow stream of argon, the flask was immersed in a Woods metal bath at 260°C. Rapid evolution of phenol occurred. After 10 minutes the bath temperature was raised to 280°C. and vacuum slowly applied to assist removal of residual phenol and continue the polymerization. The thick polymer residue was heated at about 0.6 mm pressure for 1.5 hours. The bath was removed and the polymer worked up as in Example 1. A clear, tough, light-brown polymer resulted, from which long fibers could be drawn at 270-280°C. Polymer onset Tg was 196°C. Inherent viscosity at 0.5% concentration in 98% sulfuric acid was 0.37.

EXAMPLE 5

The procedure in Example 4 was repeated, except the ingredients charged to the flask were: 4 g 3,4'bisaminophenyl ether; 7.5 g diphenyl 5-t-butylisophthalate; 0.01 g cesium fluoride. The product was a clear, tough, light-brown polymer. Films could be pressed at 345°C. and 10,000 psi pressure. The films were clear and could be hand drawn 2-3x on a hot bar at 290°C. The polymer inherent viscosity was 0.52 measured in sulfuric acid.

EXAMPLE 6

The procedure of Example 4 was repeated, except the ingredients charged to the flask were: 4 g 3,4'-bis-aminophenyl ether; 6.73 g diphenyl 5-t-butylisophthalate; 0.6 g diphenyl adipate; 0.01 g cesium fluoride. The product was a tough, light-brown polymer which could be melted at 329°C. on a hot bar. Films could be pressed at 330°C. and 20,000 psi. These films were clear and could be drawn 2x at 280°C. The polymer inherent viscosity was 0.65 measured in sulfuric acid.

I claim:

1. A melt-processible aromatic/aliphatic copolyamide having a Tg greater than 150°C. consisting essentially of the following recurring structural units:

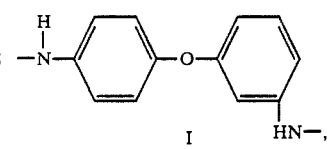

I

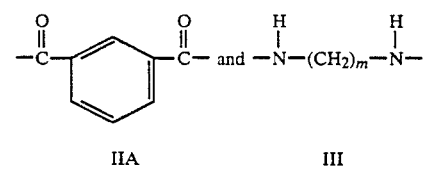

IIA    III where m is an integer of from 6-12 and unit III comprises from about 5 to 15 mol % of the mixture of units I and III, the number of amino and carbonyl groups in the copolyamide being in substantially equimolar proportions.

2. A (co) polyamide according to claim 1 wherein m is 12.

3. A (co) polyamide according to claim 1 wherein m is 6.

4. A melt-processible aromatic/aliphatic copolyamide having a Tg greater than 150°C. consisting essentially of the following recurring structural units:

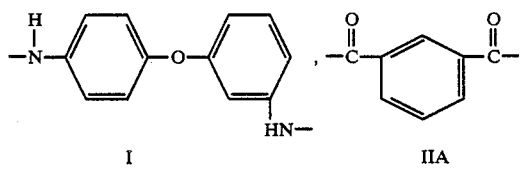

I, IIA

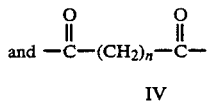

IV where n is an integer of rom 4-10 and unit IV comprises from about 5-15 mol % of the mixture of units IIA and IV, the number of amino and carbonyl group in the copolyamide being in substantially equal proportions.

5. A (co) polyamide according to claim 4 wherein n is 4.

6. A melt-processible aromatic polyamide having a Tg greater than 150°C. consisting essentially of the following recurring structural units:

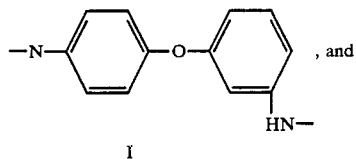

I

-continued

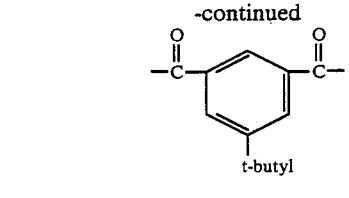

IIB the number of amino and carbonyl groups in the polyamide being in substantially equimolar proportions.

7. A melt-processible aromatic/aliphatic polyamide having a Tg greater than 150°C. consisting essentially of the following recurring structural units:

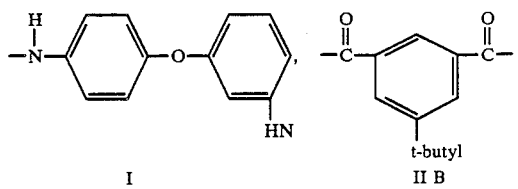

I, II B

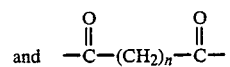

IV where n is an integer of from 4-10 and unit IV comprises from 0 to 15 mol % of the mixture of units II B and IV, the number of amino and carbonyl groups in the (co)polyamide being in substantially equimolar proportions.

* * * * *